May 3, 1932.    S. BADANES    1,857,038

COUNTING CARD

Filed April 14, 1931

INVENTOR.
Saul Badanes

BY
J. Kaplan
ATTORNEY.

Patented May 3, 1932

1,857,038

UNITED STATES PATENT OFFICE

SAUL BADANES, OF BROOKLYN, NEW YORK

COUNTING CARD

Application filed April 14, 1931. Serial No. 530,103.

The invention relates to an education device known as a counting card for teaching arithmetic to children.

The main object of the counting card is to help the teacher carry out the initial steps of teaching arithmetic as a true educational process and not as a mere method of teaching the pupil to reach fixed conclusions. The special purpose of the counting card is to help children learn to understand through their own self-activity the process of counting and calculating with numbers from 1 to 20.

First the counting card helps to develop in the mind of the child the most important attribute of a number concept; namely, its serial nature. During the stage of counting from 1 to 10 the counting card imparts to the child a mental picture of the number scale. Children cannot calculate unless they have a mental picture of the number scale. By means of the counting card we are able to provide a transitional stage from counting to calculating. We establish this connection by adding and subtracting, first in single steps by means of ordinals. The counting card helps the pupil to understand the actual process of adding and subtracting. In working addition and subtraction with the help of the counting card the pupil is able to recognize the problem, the solution and the answer. This is made possible by slips representing units which are movable, separable and printed in two colors.

Second with the help of the ten-slip and single slips the pupil is introduced to the plan of the structure of our decimal system. In this way the pupil is taught to view 10 as a new unit for counting and calculating. The counting card helps to separate and complete every number from 1 to 10 and helps the child to understand and memorize all the addition and subtracting combinations.

The construction of the counting card has been guided by certain underlying features. The single units of the counting card are arranged into distinct and separate groups of five units each. The middle member of each one of these two groups may be made to stand out bodly from the other four units by the insertion of an additional mark or sign. In this way each group of five is subdivided into three parts, one middle member and two side members of two units each. As a result of this construction of the card, the place of each unit from 1 to 10 can be perceived at a glance.

When the pupils first become acquainted with the counting card they become conscious of the above special characteristics. The teacher helps the pupil in this way: She draws attention to the first group of the five slips and points out the place of one at the beginning and five at the end of the group. Three is in the middle and two is at the left and four to the right of three. The teacher does the same with the second group. Constant practice in recognizing on the counting card each unit of the first ten at a glance, will follow. The first and sixth are to be recognized by their places at the beginning of the two groups of five; the third and eighth by their advanced position; the second and seventh by their places at the left of three and eight; and the fourth and the ninth at the right of three and eight respectively; the fifth and tenth by their places at the end of the two groups of five.

The advantages in using the counting card may be summed up as follows: First, the counting card is a device for grouping dots in such a way that their total may be clearly recognized without counting. Second, this counting device, which is a distinct, concrete, linear series, is an important step in the development of the number scale in the abstract. Third, it helps the pupil to an insight into the actual process of calculation. One of its most important functions is to give to the pupil an insight into the meaning of arithmetical operation, hence its easily divisible and movable parts. Finally, it introduces the pupil, by gradual steps to our decimal system, one of the main characteristics of which is the comprehension of ten definite units as one unit of a higher order. Thus the counting card helps the pupil at every stage where objective is needed.

The employment of the counting card is not only a help in developing number concepts, but is also indispensible in teaching addition and substraction. The counting card is used solely as a device to help the pupil to think out the process and to get an insight into the process. Ultimately the pupils learn to get along without the counting card.

For a more general understanding of the invention attention is now called to the drawings.

In the drawings

Figure 1:
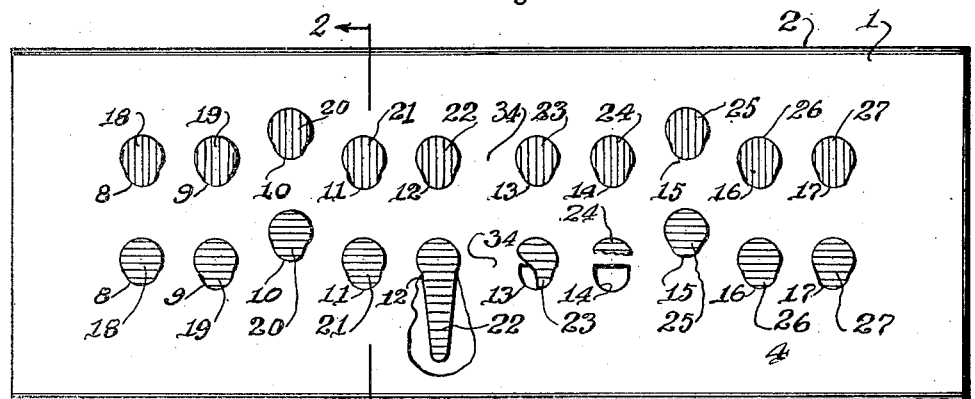
Figure 1 is a front view of the counting card.
Figure 4:
Figure 4 is a detail showing the slots.
Figures 2, 3:
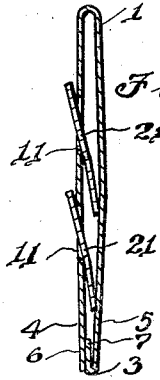
Figure 2 is a section on line 2—2 of Figure 1.
Figure 3 is a detached view of one of the slips.

Referring now to the drawings in detail, numeral 1 designates the backing of the counting card. Said backing is preferably made from a sheet of card-board or the like, folded over at the horizontal scores 2 and 3 and forming two wall members 4 and 5. The two ends 6 and 7 of the wall members are glued together at the bottom.

Cut in the front wall member 4 are two parallel rows of slots comprising ten in each row. Each of the slots is cut in the form of a semi-circle. Said slots are numbered for the purpose of the specification 8, 9, 10, 11, 12, 13, 14, 15, 16 and 17. These slots are adapted to hold tabs or slips 18, 19, 20, 21, 22, 23, 24, 25, 26 and 27. In actual practice no numbers appear on the device. The rows of slips are of contrasting colors. For instance the upper row may be red and the lower row may be blue. The slips are made of card-board and comprise an enlarged circular head which protrudes above the slots and a reduced tapered shank portion which enters the slots. The slip when inserted into the semi-circular slot forms a colored circle which protrudes above the slot. Adjacent the end slots 8 and 17 are crescent slots 28 and 29 for supporting the ends of a bar (not shown). Printed on the outside surface of the bars are circles 32 and 33 spaced substantially the same as the slips.

As will be noted in Figure 1, the slips 8 to 12, inclusive, and 13 to 17, inclusive, are separated by a comparatively wide space 34 which is wider than the spaces between the rest of the slips. Also the slips 10 and 15 are positioned higher than the rest of the slips and above the said slips 10 and 15 are marks 35 and 36 to make them stand out boldly.

The slips are supposed to represent the series of numbers 1 to 10. These numbers occupy a very important place in our decimal system of numeration because they are the elements of which higher numbers are composed. The art of calculation consists of breaking up the series and recombining some of its members, in other words, it consists of ascending and descending the number scale.

In practice all the clips are removed and the pupil is taught to count, for instance, by first putting one slip in place representing the numeral 1. Then one or two additional slips are put in place and the result added. After that a few more slips are placed in the slots and the whole amount ascertained. By using a variety of figures a great number of problems may be performed. Also the child may be taught to substract in the like manner. As the middle members or slips 10 and 15 stand out boldly from the other four units by their raised positions and the addition of the marks 35 and 36 above them, the place of each unit from 1 to 10 can be perceived at a glance. The children may be taught to associate the slips with other objects and various calculations of the said objects may be done on the card. For instance a question may be asked "A boy picked five apples from a tree and three apples from another tree. How many did he pick?" In solving this problem the pupil refers to the slips on the card and obtains the answer 8.

In beginning to study numbers above 10, the pupil crosses the first threshold of the decimal system of enumeration. They are here introduced to a new idea; namely, that of a series of ten units as a single unit group. They are to learn that the contents of each number from now on is determined not only by its place in the series, but also by its place in our number system. This knowledge the pupils need in order to be able to perform calculations with numbers above ten, especially with large numbers.

The pupil may be introduced to the second decade in two ways: (1) He may add successively 1 to each number, beginning with a ten, and in this way continue the number series beyond ten: 10 plus 1 equals 11, 11 plus 1 equals 12, 12 plus 1 equals 13, 13 plus 1 equals 14, etc. Counting is then still the mode of forming numbers. Or (2) he may consider ten as a higher unit and develop each new number of the second decade by adding successively to its collective unit, ten, every member of the primary series from 1 to 10; thus, 10 plus 1 equals 11, 10 plus 2 equals 12, 10 plus 3 equals 13, 10 plus 4 equals 14, 10 plus 5 equals 15, 10 plus 6 equals 16, etc. The second method is by far preferable because the pupil must grasp the decimal composition of numbers. In the second way only, then, each new number from 11 to 20 is conceived as possessing an attribute which the first ten cardinals lack; namely, each number is made up of a decade and one or more units. That is the essence of the decimal system.

Here the counting card renders a valuable service. By means of the one-ten slip of the counting card, the pupil comprehends numbers from ten to twenty, not only as of a series, but as a plurality made up of a ten and an already familiar number; 14 is not only 1 after 13, but it is also 10 plus 4. By means of the counting card, the pupil sees objectively the merging of the number scale and the decimal system of numeration into one.

In the same manner we use the counting card to help the pupil see that the basic operations are carried over to the second decade. For instance, we wish the pupil to see that 16 plus 3 equals 19, because 6 plus 3 equals 9. With the help of the counting card, the teacher shows the pupil that 16 is built from 10 and 6 units; therefore, in order to add 3 units to 16, we simply let the 6 units grow into 9 units by adding to them 3 units, the ten-group remaining unchanged. The pupil must soon learn to transfer the basic operations thoughtfully and without any objective aids. The success of addition and subtraction within the higher decades depends on getting the pupil to work thoughtfully with the second decade rather than merely using objective aids to get answers without insight into the process of the transfer of basic operations.

It will thus be seen that I have provided an apparatus for a method of teaching children the thoughtful process of counting. The counting card is deliberately planned to help the pupil to remember the number scale with clearness and certainty. The pupil substitutes this number scale for the groups of concrete objects to be added or subtracted and thus takes an important step toward the power to perform the arithmetical processes mentally, i. e., without the help of objects. The counting card places in the hand of every pupil a concrete picture of the number scale. It is constructed so as to make each unit from 1 to 10 not only visible and movable but also visible at a glance. The exercises in separating, comparison, and completion further help the pupil to work conceptually with numbers.

Having described my invention, I claim,

1. In a device of the class described, the combination of a backing, of a series of removable slips associated with said backing, means to support said slips in said backing, said slips arranged in two parallel rows comprising ten slips in each row, the first, second, fourth, fifth, sixth, seventh, ninth and tenth slip being on a straight line, the third and eighth slip of each row being arranged higher than the rest of the slips.

2. In a device of the class described, the combination of a backing, of a series of ten removable slips in a row associated with said backing, means to support said slips in said backing, the first, second, fourth, fifth, sixth, seventh, ninth and tenth slip being on a straight line, the third and eighth of said slips being arranged higher than the rest.

3. In a device of the class described, the combination of a backing, of a series of removable slips associated with said backing, means to support said slips in said backing, said slips arranged in two parallel rows comprising ten slips in each row and divided into groups of five, the space between each group being larger than the space between the rest of the slips, the first, second, fourth, fifth, sixth, seventh, ninth and tenth slip being on a straight line, the third and eighth slip of each row being arranged higher than the rest of the slips.

4. In a device of the class described, the combination of a backing, of a series of removable slips associated with said backing, means to support said slips in said backing, said slips arranged in two parallel rows comprising ten slips in each row and divided into groups of five, the space between each group being larger than the space between the rest of the slips, the slips on the upper row being of a different color than the slips on the lower row.

In testimony whereof I affix my signature.

SAUL BADANES.